(12) United States Patent
Nakazawa et al.

(10) Patent No.: US 10,459,131 B2
(45) Date of Patent: Oct. 29, 2019

(54) RETROREFLECTIVE SHEETING AND VEHICLE LICENSE PLATE

(71) Applicant: NIPPON CARBIDE INDUSTRIES (HANGZHOU) CO., LTD., Hangzhou, Zhejiang (CN)

(72) Inventors: Hiroki Nakazawa, Zhejiang (CN); Shinya Kanamori, Zhejiang (CN); Yosuke Meta, Zhejiang (CN); Daisuke Yoneda, Zhejiang (CN)

(73) Assignee: NIPPON CARBIDE INDUSTRIES (HANGZHOU) CO., LTD., Hangzhou (CN)

( * ) Notice: Subject to any disclaimer, the term of this patent is extended or adjusted under 35 U.S.C. 154(b) by 255 days.

(21) Appl. No.: 15/665,468

(22) Filed: Aug. 1, 2017

(65) Prior Publication Data

US 2017/0329061 A1 Nov. 16, 2017

Related U.S. Application Data

(63) Continuation-in-part of application No. PCT/CN2015/078289, filed on May 5, 2015.

(51) Int. Cl.
*B32B 27/00* (2006.01)
*G02B 5/124* (2006.01)
*G02B 5/128* (2006.01)

(52) U.S. Cl.
CPC .............. *G02B 5/124* (2013.01); *B32B 27/00* (2013.01); *G02B 5/128* (2013.01)

(58) Field of Classification Search
None
See application file for complete search history.

(56) References Cited

U.S. PATENT DOCUMENTS

2004/0018344 A1* 1/2004 Watkins ................ G02B 1/105
428/156

FOREIGN PATENT DOCUMENTS

| CN | 1233997 A | 11/1999 |
|---|---|---|
| CN | 101116015 B | 9/2010 |
| EP | 1225554 A1 | 7/2002 |

OTHER PUBLICATIONS

International Search Report of PCT Patent Application No. PCT/CN2015/078289 dated Feb. 18, 2016.

* cited by examiner

*Primary Examiner* — Sheeba Anmed

(57) ABSTRACT

A retroreflective sheeting, comprising a surface protective layer; the surface protective layer comprises at least one acrylic polymer; the glass-transition temperature (Tg) of the product generated from the reaction of the acrylic polymer is 10° C.-35° C. and the coagulation ratio is 0%-95%; such retroreflective sheeting has favorable weatherability, low-temperature embossing resistance and adhesion resistance; it also discloses a vehicle license plate adopting the retroreflective sheeting.

12 Claims, 1 Drawing Sheet

RETROREFLECTIVE SHEETING AND VEHICLE LICENSE PLATE

CROSS REFERENCE TO RELATED APPLICATIONS

The present application is a Continuation-In-Part Application of PCT Application No. PCT/CN2015/078289 filed on May 5, 2015, the contents of which are hereby incorporated by reference.

TECHNICAL FIELD

The Invention relates to a reflective material-retroreflective sheeting, and further to a vehicle license plate adopting such retroreflective sheeting.

BACKGROUND ART

Retroreflective products have been widely used in signs as road sign and engineering sign, license plates for vehicles as automobile or motorcycle, safety materials as clothes and life-saving appliances and marks as advertising board, etc. The retroreflective products have been developed currently comprise those of bead and prism types (such as cubic angle). These products can guaranty safety in some harsh environments. For example, when used in the environments with extreme temperature conditions, low visibility, atmospheric pollution, or photochemical reactions caused by infrared, visible, ultraviolet radiations in sunlight, the retroreflective products can be recognized easily.

The retroreflective products are most widely used in vehicle license plates. Normally, the retroreflective sheeting with adhesives should be firstly pasted onto a base material as aluminum alloy plate; as the marking part is printed through the methods as roller painting or hot stamping after being molded by a convex pattern, a license plate is then manufactured.

As for the retroreflective sheeting disclosed in the patent literature EP1225554A1 by Petra et al., the actual elongation of which when ruptured is more than 40%, but vinyl chloride resin is used in the disclosed embodiments. Such retroreflective sheeting is soft and can meet the processing requirements, but the resins as vinyl chloride resin and polyurethane resin have poor weatherability and durability. As the license plates as vehicle license plate, road sign and engineering sign should be used in the open air for a long time, they must have outstanding weatherability, therefore, such resins are not suitable for the signs as road sign and engineering sign, or the license plates for vehicles as automobile or motorcycle that need durability.

In addition, Nakazawa Hiroki et al. have disclosed a retroreflective sheeting in the patent literature CN200680004431.9, which uses acrylic resin, alkyd resin and polyester resin, butyral resin for its surface and mentioned that these resins are in favor of improving the weatherability of the retroreflective sheeting. Meanwhile, they also mentioned in the Embodiments that the used acrylic resin is a copolymer of three resins as butyl acrylate resin, methyl methacrylate resin and acrylic acid resin; however, neither real improvement nor contrastive analysis on the improvement of weatherability is specified therein. Moreover, although acrylic resin is helpful to improve the weatherability of the retroreflective sheeting, it has high hardness and poor softness. Therefore, the retroreflective sheeting might be ruptured during convex pattern molding when a license plate is manufactured, thus the resin is hard to be used for producing license plates.

Therefore, a retroreflective sheeting that can meet the requirements for both weatherability and processing and the methods for manufacturing the retroreflective sheeting and the vehicle license plate adopting such retroreflective sheeting are desperately in need.

SUMMARY OF THE INVENTION

The Invention is to overcome the defects in prior art and provide a retroreflective sheeting having outstanding weatherability and favorable embossing resistance under low-temperature environment, and also provides a vehicle license plate adopting such retroreflective sheeting.

The technical scheme of the Invention is as follows:

A retroreflective sheeting, comprising an outermost surface protective layer, wherein, the surface protective layer comprises at least one acrylic polymer; the glass-transition temperature (Tg) of the product generated from the reaction of the acrylic polymer of the protective layer is 10° C.-35° C. and the coagulation ratio is 0%-95%.

The surface protective layer comprises at least two acrylic polymers; the Tg of one polymer is more than 35° C. or the Tg is lower than 10° C.; or the Tg of one polymer is more than 35° C. and the Tg of the other polymer is lower than 10° C.

Further, the coagulation ratio of the surface protective layer is 10%-80%; the Tg of the product generated from the reaction of the polymer is 21° C.-35° C.

The acrylic polymer contains component units derived from hydroxylic monomers or carboxylic monomers; the acrylic polymer is crosslinked through at least one of crosslinking agent of isocyanates, crosslinking agent of epoxy resins, melamine crosslinking agent and metallochelate crosslinking agent; further, the crosslinking agent of isocyanates is preferred.

The acrylic polymer is a homopolymer of alkyl acrylate monomers, or a copolymer of at least one of hydroxylic monomers, carboxylic monomers, amino monomers and epoxy monomers copolymerized with the alkyl acrylate monomers.

Preferably, the acrylate monomer is selected from at least one of methyl acrylate, ethyl acrylate, n-propyl acrylate, isopropyl acrylate, n-butyl acrylate, tert-butyl acrylate, isobutyl acrylate, n-hexyl acrylate, cyclohexyl acrylate, 2-ethyl hexyl acrylate, n-octyl acrylate, iso-octyl acrylate, methyl methacrylate, ethyl methacrylate, n-propyl methacrylate, isopropyl methacrylate, n-butyl methacrylate, tert-butyl methacrylate, isobutyl methacrylate, n-hexyl methacrylate, cyclohexyl methacrylate, 2-ethyl hexyl methacrylate, n-octyl methacrylate and iso-octyl methacrylate.

Preferably, the hydroxylic monomer is alkyl acrylate or that containing allyl alcohol, methallyl alcohol and polyethylene glycol monoacrylate; the alkyl acrylate is selected from any one of acrylic acid-2-hydroxyethyl, acrylic acid-2-hydroxypropyl acrylate and acrylic acid-2-hydroxybutyl acrylate.

The acrylic polymer is a polymer with a weight-average molecular weight of more than 30,000; the number of carbon atoms in the alkyl acrylate monomer is 3-12 and 4-6 carbon atoms are preferred.

The surface protective layer of the retroreflective sheeting also comprises a retentive layer, a focusing layer and a light-reflecting layer laminated successively from top to bottom; a glass microbead is arranged between the surface protective layer and the retentive layer; the glass microbead is embedded in the surface protective layer and the retentive layer respectively; the thickness of the surface protective layer is 75% larger than the diameter of the glass microbead.

The acrylic polymer is a methyl acrylic polymer.

A vehicle license plate of retroreflective sheeting, further comprising a metal plate closely fitted to the retroreflective sheeting; the metal plate and the retroreflective sheeting form a marking part protruded on one end of the retroreflective sheeting through embossing processing.

The advantages of the Invention are as follows:

The Invention uses the compound of acrylic polymer as the protective layer of the retroreflective sheeting and adjusts the coagulation ratio and the glass-transition temperature of the compound to make it has favorable weatherability and softness; wherein, through comparison of color difference, the color difference is small, which indicates that the weather resistance effect is significant; while through low-temperature embossing resistance evaluation, the embossing depth is mostly more than 2.00 mm or even 2.25 mm, which meets the processing requirements; in addition, through anti-adhesion evaluation and printability evaluation, the area ratio of adhesion traces is mostly less than 5% of the overall sheeting and the printability can meet the basic requirements.

The methods for manufacturing the retroreflective sheeting of the Invention is simple with less equipment input; moreover, the cost of acrylic resin used in such retroreflective sheeting is low, which is suitable for mass industrial production and extensive promotion; while as for the vehicle license plate adopting the retroreflective sheeting, it only needs to form a marking part through embossing processing without being ruptured during processing, and thus has a high stability.

Marks in the figures are as follows: 1—surface protective layer, 2—printing layer, 3—retentive layer, 4—glass microbead, 5—focusing layer, 6—light-reflecting layer, 7—adhesive layer, 8—peeling substrate, 9—marking printed object, 10—metal plate.

DETAILED DESCRIPTION OF THE INVENTION

A clear and full description of the technical schemes of the embodiments of the Invention will be given in combination of the drawings of the embodiments of the Invention as follows. Obviously, the described embodiments are just a part rather than the whole of the embodiments of the Invention. Based on the embodiments of the Invention, any other embodiments obtained by a person skilled in the art without any creative work will fall within the protection scope of the Invention.

In the Invention, the acrylic polymer comprises a methyl acrylic polymer.

The retroreflective sheeting of the Invention is any one of a retroreflective sheeting of sealed lens type, a retroreflective sheeting of capsule lens type and a retroreflective sheeting of prism type.

Figure 1:
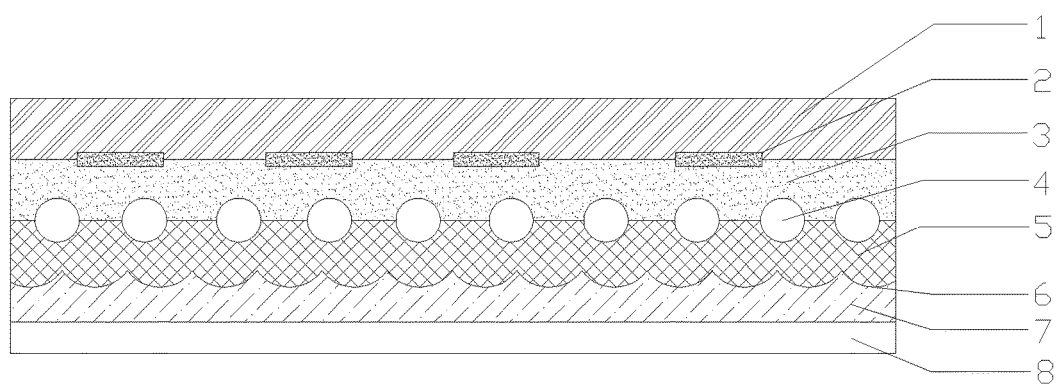
FIG. 1 is a schematic diagram of the retroreflective sheeting.

As shown in FIG. 1, a retroreflective sheeting, comprising a surface protective layer 1, a retentive layer 3, a focusing layer 5 and a light-reflecting layer 6 laminated successively; glass microbeads 4 are arranged between the retentive layer 3 and the focusing layer 5. In addition, a printing layer 2 is further arranged between the surface protective layer 1 and the retentive layer 3 for coloring the retroreflective sheeting with a stain material as ink; moreover, an adhesive layer 7 is arranged below the light-reflecting layer as needed, thus the retroreflective sheeting can be pasted onto all kinds of substrates; meanwhile, peeling substrate 8 is arranged below the adhesive layer 7 for protection.

The surface protective layer of the retroreflective sheeting comprises at least one acrylic polymer. When the surface protective layer comprises one acrylic polymer, the Tg (glass transition temperature) of the polymer is 10° C.-35° C.; under this circumstance, the retroreflective sheeting can maintain a favorable weatherability and adhesion resistance and a coagulation ratio of 0%-95%, which can improve the softness and make it have an outstanding embossing resistance under low-temperature environment; while when the surface protective layer comprises two or more acrylic polymers, the polymer comprises at least one polymer with a Tg of more than 35° C. or that with a Tg of lower than 10° C.; the overall Tg of the compound after reaction can be easily adjusted with this method.

In case both the Tg of the polymer comprising one acrylic polymer and the Tg of the product generated from the reaction of the acrylic polymer comprising two acrylic polymers are below 10° C., the weatherability, film-forming property and adhesion resistance will be reduced; while when the Tg is more than 35° C., the film-forming property and the embossing resistance will be also reduced.

However, the Tg of the product generated from the reaction of the two acrylic polymers is 10° C.-35° C.; under this circumstance, the retroreflective sheeting can maintain a favorable weatherability and adhesion resistance and a coagulation ratio of 0%-95%, which can improve the softness and make it have an outstanding embossing resistance under low-temperature environment.

The Tg of above mentioned polymer comprising one acrylic polymer or two acrylic polymers is the mole-average glass-transition temperature (mol/Tg) calculated according to following computing method.

The $Tg_1$, $Tg_2$, . . . and $Tg_n$ are glass-transition temperatures of the polymers of monomer composition 1, monomer composition 2, and monomer composition n, which are all calculated after being converted into absolute temperatures (K). $m_1$, $m_2$, . . . $m_n$ are mole fractions of all monomer compositions.

The Tg of the composition constituted by more than two acrylic polymers is calculated through the mole fractions of the monomer compositions contained in the compound. In other words, when acrylic polymer type 1 and acrylic polymer type 2 contain the same monomer composition, the total value of the same monomer composition should be the mole fraction of each monomer composition.

The calculation formula of lass-transition temperature (Tg) is as:

$$\frac{1}{Tg} = \frac{m_1}{Tg_1} + \frac{m_2}{Tg_2} + \ldots + \frac{m_n}{Tg_n}$$

The "Tg of homopolymer" used above adopts the Tg of monomers recorded in Pages 11-35 of *Mechanical Property of Macromolecule* written by L E Nelson and translated by Onoki Senji.

The calculation method of coagulation ratio is as follows:

Packaging the surface protective layer of 7.5 cm×7.5 cm with a screen mesh of 280 meshes as a test sample; weighting the sample for its mass and then dipping the sample into ethyl acetate (EAC) for 72 h at 23° C.; taking out the sample from and washing off the EAC and drying it for 24 h at 120° C.; then weighting the sample and calculating the coagulation ratio (mass %) based on the mass changes of the sample before and after being dipped in EAC.

The above embossing resistance refers to the fracture resistance of the retroreflective sheeting after the processing as convex pattern molding when a license plate is manufactured; the adhesion resistance refers to that when the retroreflective sheeting is rolled, or the cut sheet is overlaid, or the materials as aluminum alloy plate that are pasted with the cut sheet is overlaid, the sheet surface will not adhere to other sheets when the retroreflective sheeting is stored with loading (especially under high temperature), and the appearance of the sheet surface will not be damaged.

The surface protective layer of the Invention is not limited to 1 layer, but can be more than 2 layers. As for more than 2 layers, the first layer and the second layer can be of different materials; the outermost layer is preferably has outstanding weatherability and printability and the inner layer (which is more internal than the outermost layer) is preferably has outstanding softness.

The polymer that forms the surface protective layer of the Invention can be a homopolymer of alkyl acrylate monomers, or a copolymer of at least one of hydroxylic monomers, carboxylic monomers, amino monomers and epoxy monomers copolymerized with acrylate monomers; the weight-average molecular weight of the polymer is more than 30,000, wherein, the polymer with a weight-average molecular weight of 100,000~600,000 is preferred and further the polymer with a weight-average molecular weight of 200,000~400,000 is preferred. The weight-average molecular weight can be measured through well-known measuring apparatuses such as the Gel Permeation Chromatograph (GPC).

The number of carbon atoms in the alkyl acrylate monomer is 3~12 and further 4~6 carbon atoms are preferred. Wherein, the alkyl acrylate monomer is selected from at least one of methyl acrylate, ethyl acrylate, n-propyl acrylate, isopropyl acrylate, n-butyl acrylate, tert-butyl acrylate, isobutyl acrylate, n-hexyl acrylate, cyclohexyl acrylate, 2-ethyl hexyl acrylate, n-octyl acrylate, iso-octyl acrylate, methyl methacrylate, ethyl methacrylate, n-propyl methacrylate, isopropyl methacrylate, n-butyl methacrylate, tert-butyl methacrylate, isobutyl methacrylate, n-hexyl methacrylate, cyclohexyl methacrylate, 2-ethyl hexyl methacrylate, n-octyl methacrylate, iso-octyl methacrylate.

The hydroxylic monomer is a polymerizable double-bond compound containing hydroxyl; further, the hydroxylic monomer is alkyl acrylate; further, the alkyl acrylate is selected from any one of the hydroxylic monomers of acrylic acid-2-hydroxyethyl, acrylic acid-2-hydroxypropyl acrylate and acrylic acid-2-hydroxybutyl acrylate, or the hydroxylic monomer containing allyl alcohol, methallyl alcohol and polyethylene glycol monoacrylate (methacrylate).

The carboxylic monomer is a polymerizable double-bond compound containing carboxyl; further, the hydroxylic monomer is alkyl acrylate; further, the carboxylic monomer is selected from acrylic acid, methacrylic acid, crotonic acid, maleic anhydride, fumaric acid, itaconic acid, pentenedioic acid and citraconic acid.

The amino monomer is a monomer containing acylamino; further, the amino monomer is selected from one of acrylamide, methacrylamide, diacetone acrylamide, diacetone methacrylamide, N-hydroxymethyl acrylamide, N-hydroxymethyl methacrylamide, and N-butoxy methacrylamide.

The epoxy monomer is selected from one of glycidyl acrylate, glycidyl methacrylate, allyl glycidyl ether, methyl allyl glycidyl ether.

Further, in consideration of the weatherability and adhesion resistance required in the Invention, the acrylic polymer used in therein is preferably a copolymer copolymerized by the component units derived from alkyl acrylate monomers and the component units derived from hydroxylic monomers or carboxylic monomers; further, the copolymer copolymerized by the component units derived from alkyl acrylate monomers with 4-6 carbon atoms and the component units derived from hydroxylic monomers is preferred.

The protective layer of the retroreflective sheeting can also comprise crosslinking agents besides acrylic polymers, i.e., the surface protective layer can be of a cross-linked structure formed through the reaction of acrylic polymer and crosslinking agents, or a non-crosslinked structure. When the surface protective layer comprises crosslinking agents, acrylic polymer that contains the component units derived from hydroxylic monomers or carboxylic monomers is preferred.

The crosslinking agent in the protective layer is selected from at least one of crosslinking agent of isocyanates, crosslinking agent of epoxy resins, melamine crosslinking agent and metallo-chelate crosslinking agent; in consideration of the available weatherability, embossing resistance and printability, the crosslinking agent of isocyanates is preferred.

In addition to crosslinking agents, the adjuvant as coloring agent, ultraviolet light absorber, stabilizer, antioxidant and plasticizer can also be added in the surface protective layer. Wherein, the ultraviolet light absorber is selected from at least one of the compounds of benzotriazoles, cyanoacrylates, benzophenones, benzoic acids, salicylic acids and triazines; wherein, the compounds of benzophenones, benzotriazoles and cyanoacrylates are preferred; the additive amount of the ultraviolet light absorber is 0.1%-10.0% of the compound mass fraction of the surface protective layer.

The ductility of the surface protective layer of the Invention should be more than 50%; preferably more than 75% and more preferably up to 100%. The ductility of the surface protective layer is a value measured with the tensile testing machine AGS-J produced by Shimadzu Co., Ltd. under the environment of 23° C. and a humidity of 50% at a tensile speed of 300 mm/min when the width of the sample is 25 mm and the gripping interval of the sample is 100 mm. To further improve the softness and embossing resistance of the retroreflective sheeting, the thickness of the surface protective layer is arranged as 75% more than the diameter of the glass microbead.

In the retroreflective sheeting, the retentive layer is laminated below the surface protective layer to fix the glass microbead; partial glass microbead is partially embedded in the retentive layer and the other part is embedded in the focusing layer; the retentive layer uses at least one of acrylic resin, alkyd resin, fluororesin, PVC resin, polyester fiber, polyurethane resin and polycarbonate; further, at least one of acrylic resin, polyester fiber and polyurethane resin is preferable; in consideration of the factors as the coating adaptability and retainability of the glass microbead, acrylic resin is preferred. In addition, the thickness of the retentive layer is 15 μm-50 μm; the weight-average molecular weight of the resin used in the retentive resin is more than 50,000; wherein, the resin with a weight-average molecular weight of 50,000-400,000 is preferred and further the resin with a weight-average molecular weight of 100,000-300,000 is preferred. In addition to resins, the adjuvant as coloring agent, ultraviolet light absorber, stabilizer, antioxidant or plasticizer can also be added in the retentive layer.

The diameter of the glass microbead in the retentive layer is 40 μm~65 μm, wherein, the glass microbead with a diameter of 50 μm~65 μm is preferred; when the diameter is less than 65 μm, a proper focal length can be maintained and when the diameter is more than 40 μm, the reflecting property of the retroreflective sheeting of sealed lens type can be further improved. In addition, the refractive index of the glass microbead is 1.9~2.5, wherein, the glass microbead with a refractive index of 2.0-2.3 is preferred; when the refractive index is more than 1.9, a proper focal length can be maintained and when the refractive index is less than 2.5, the transparency of the glass microbead is better. Further, the embedding rate of the glass microbead is more than 20%, wherein, 50%-90% is preferred and further 70%-80% is preferred.

The focusing layer is laminated below the retentive layer to cover the projection of the glass microbead in the retentive layer; the focusing layer is a layer arranged with the focal position of the glass microbead on the light-reflecting layer, normally selected from at least one of acrylic resin, alkyd resin, fluororesin, PVC resin, polyester fiber, polyurethane resin, polycarbonate and butyral resin. The weight-average molecular weight of the resin is 100,000~400,000 and further the resin with a weight-average molecular weight of 150,000~300,000 is preferred.

The light-reflecting layer is for reflecting lights, which is normally formed by the metals as aluminum, silver, chromium, nickel, magnesium, gold, tin through vacuum vapor deposition and sputtering; the method of vapor deposition is ideal for uniformly forming a metallic film that reflects the shape of the focusing layer; the thickness of the light-reflecting layer is 0.03 μm~0.30 μm, wherein, 0.05 μm~0.20 μm is preferred and further 0.06 μm~0.15 μm is preferred.

The retroreflective sheeting is also arranged with an adhesive layer for pasting the retroreflective sheeting onto the substrates as aluminium alloy plate. The type of resin forming the adhesive layer is not specifically limited and the resins that are normally used as adhesives can be adopted. The resins used as adhesives can be acrylic resin, silicon resin and phenolic resin, etc., wherein, acrylic resin and silicon resin that have outstanding weatherability and favorable cohesiveness are more suitable. In consideration of cohesiveness, the adhesive layer adopts the adhesive resin with a weight-average molecular weight of more than 500,000, wherein, the adhesive resin a weight-average molecular weight of 500,000~1,200,000 is preferred and further the adhesive resin a weight-average molecular weight of 600,000-1,000,000 is preferred.

The above acrylic polymer includes methyl acrylic polymer; wherein, methyl acrylic polymer refers to that it contains component units of methacrylic acid.

The retroreflective sheeting that contains a surface protective layer, a retentive layer, glass microbeads, a focusing layer, a light-reflecting layer, an adhesive layer and a peeling base material will be described in following embodiments.

The acrylic polymers used in following embodiments comprise:

Acrylic polymer I (mass ratio): 57% MMA+36% EA+7%2HEMA

Acrylic polymer II (mass ratio): 21% MMA+65% EA+14%2HEMA

Acrylic polymer III (mass ratio): 47.6% MMA+45.4% EA+7%2HEMA

Acrylic polymer IV (mass ratio): 53.4% MMA+39.6% EA+7%2HEMA

Acrylic polymer V (mass ratio): 33.4% MMA+59.6% EA+7%2HEMA

Wherein, MMA-methyl methacrylate (Tg103° C.)

EA-ethyl acrylate (Tg−27° C.)

2HEMA-methacrylic acid-2-hydroxyethyl (Tg55° C.)

Embodiment 1

The protective layer of the retroreflective sheeting comprises two acrylic polymers; the proportion of the formula in part by mass of the coating solution is as follows:

Acrylic polymer I (produced by Nippon Carbide Industries (Hangzhou) Co., Ltd., RS-1400, Tg=40° C., weight-average molecular weight=280,000): 70 parts by mass Acrylic polymer II (produced by Nippon Carbide Industries (Hangzhou) Co., Ltd., RS-1200, Tg=2.7° C., weight-average molecular weight=240,000): 30 parts by mass Crosslinking agent of isocyanates (produced by Asahi Kasei Corporation, E405-70B): 0.7 parts by mass (0.2 equivalent weight)

Cellulose derivative (produced by Tokushiki Co., Ltd., CAB): 6 parts by mass

Methylbenzene: 21 parts by mass

The mixture of above substances with different parts by mass is the coating solution for protective layer; the Tg of the solution is 21° C. and the weight-average molecular weight is 250,000.

Manufacturing of the retroreflective sheeting:

Surface protective layer: transparent PET (produced by Hefei Lekai Technology Industry Co. Ltd.; thickness 75 μm, HA01830-121) is used as the substrate; applying the coating solution onto the transparent PET surface for heating up and drying to form a surface protective layer with a thickness of about 40 μm and a ductility of 150%. In addition, a printing layer can be printed on the surface protective layer as required.

Retentive layer: mixing 100 parts by mass of acrylic resin (produced by Nippon Carbide Industries (Hangzhou) Co., Ltd., RS-1300), 20 parts by mass of crosslinking agent of isocyanates (produced by Asahi Kasei Corporation, E405-70B) and 42.5 parts by mass of MIBK as a solvent and stirring evenly; then applying the solution onto the surface protective layer for drying; then a retentive layer with a thickness of 30 μm is formed on the surface protective layer.

Pavement of glass microbeads: paving the glass microbeads with an average diameter of 57 μm and a refractive index of 2.2 (produced by Nippon Carbide Industries (Hangzhou) Co., Ltd., NB-34S) onto the retentive layer so as the glass microbeads can be embedded into the retentive layer through thermal treatment; observing the cross section of the retentive layer through a microscope, it should be seen that 75% of the diameter of the glass microbead is embedded into the retentive layer.

Focusing layer: applying the solution mixed with 100 parts by mass of acrylic resin (produced by Nippon Carbide Industries (Hangzhou) Co., Ltd., RS-5000), 3.1 parts by mass of melamine crosslinking agent (produced by Nippon Cytec Industries Co., Ltd., MYCOAT715) and 26.8 parts by mass of ethyl acetate onto the retentive layer and the surface of the glass microbeads for dying, then a focusing layer with a thickness of 19 μm is formed on the retentive layer and the glass microbeads.

Then, aluminizing the focusing layer through vacuum evaporation to form a light-reflecting layer on the focusing layer.

A type of peeling paper (produced by Lintec Co., Ltd., EN11PCM(31)P) is used as the peeling base material; applying the solution mixed with 100 parts by mass of acrylic resin (produced by Nippon Carbide Industries (Hangzhou) Co., Ltd., PE-121E), 6.7 parts by mass of coloring agent (produced by Shanghai DIC Ink Co. Ltd., DAD-100), 1.0 parts by mass of crosslinking agent of isocyanates (produced by Nippon Polyurethane Industry Co., Ltd., CORONATE: L) and 17.5 parts by mass of ethyl acetate onto the peeling paper for drying, then an adhesive layer with a thickness of 40 μm is formed on the peeling paper.

Pasting the light-reflecting layer produced as per the above method onto the adhesive layer on the peeling paper formed as per above method, and peeling off the substrate of the retroreflective sheeting to obtain a retroreflective sheeting of the Invention with an adhesive layer; the ductility of the obtained retroreflective sheeting is 140%.

Embodiments 2~11

In Embodiments 2~11 and comparative examples 1~3, the mass ratio, the additive amount, the type of crosslinking agent, the thickness of surface protective layer and the coagulation ratio of the acrylic polymer solutions I and II in Embodiment 1 are adjusted according to Table 1. The retroreflective sheeting is manufactured under the same condition in Embodiment 1 except for the changes shown in Table 1.

Embodiments 12~14

The protective layer of the retroreflective sheeting in the embodiments comprises one acrylic polymer, i.e., 100 parts by mass of the mixed solution of acrylic polymers I and II solutions are substituted by 100 parts by mass of acrylic polymers III, IV and V solutions respectively and meanwhile the Tg is adjusted.

The retroreflective sheeting is manufactured under the same condition in Embodiment 1 except for this.

The method for preparing the acrylic polymer solution is as follows:

Adding 100 parts by mass of ethyl acetate, 47.6 parts by mass of methyl methacrylate (MMA), 45.4 parts by mass of ethyl acrylate (EA) and 7 parts by mass of methacrylic acid-2-hydroxyethyl (2HEMA) in the reaction vessel with thermometer, mixer, reflux condenser and in-turn dripping device; stirring and heating up the reaction vessel till reflux begins. After 10 min of refluxing, dissolving 0.2 parts by mass of azodiisobutyronitrile (AIBN) in 30 parts by mass of ethyl acetate solution as a polymerization initiator, dripping it into the original solution in 250 min for reaction for 120 min. After the reaction, diluting the solution with ethyl acetate to obtain the acrylic polymer solution with 35 mass % of solid content (solid content refers to the residue quantity after the volatile component is removed from the acrylic polymer solution). The Tg of the acrylic polymer in Embodiments 12 is 27.1° C. and the weight-average molecular weight is 200,000.

Comparative Example 4

The retroreflective sheeting is manufactured under the same condition in Embodiment 1 except that the surface protective layer of the retroreflective sheeting of Embodiment 1 uses PVC resin film (produced by Nippon CARBIDE Industrial Co., Ltd., N-15, thickness 40 μm); wherein, the Tg of PVC resin is 80° C. and the weight-average molecular weight is 60,000.

Comparative Example 5

The retroreflective sheeting is manufactured under the same condition in Embodiment 1 except that the surface protective layer of the retroreflective sheeting of Embodiment 1 uses double-faced adhesive treated PET (produced by Foshan Dopont Teijin Films Co., Ltd., F-8202, thickness 38 μm); wherein, the Tg of PET is 82° C.

The weatherability, embossing resistance, adhesion resistance and printability of the retroreflective sheetings in the embodiments and the comparative examples are evaluated respectively through a same method. In case the evaluation result reaches Classes A, B and C, there will be no problem in actual use. The specific evaluation method is as follows:

Evaluation on Weatherability

Conducting 3300 hours of accelerated aging test to the retroreflective sheeting of Embodiment 1, which is pasted an aluminum substrate of 75 mm×70 mm and with a thickness of 1 mm with the xenon lamp-typed accelerated aging tester (Ci65A) produced by ATLUS Company under the conditions with a wave length of 300 nm-800 nm, an irradiation intensity of 550 W/m$^2$ and 63° C. of black panel. Comparing the hue after the test with that before the test and making an evaluation as per the following standard. Measuring the hue with a color difference meter (Model SE-2000) produced by Nippon Denshoku Co., Ltd. according the standard of JIS Z 9117 (2011).

Evaluation Standard

A: ΔE is less than 2.

B: ΔE is more than 2 and less than 4.

C: ΔE is more than 4 and less than 7.

D: ΔE is more than 7.

Evaluation on Embossing Resistance

Pasting the retroreflective sheeting of Embodiment 1 onto the aluminium alloy plate with a thickness of 1mm for solidification under normal temperature for 24 h; then embossing it with embossing molds of different heights at 10° C. on a punching machine from 0.75 mm to 3.00 mm with 0.25 mm per shift. Obtaining the maximum embossing height without rupture or peeling according to this method and making an evaluation as per the following standards.

Evaluation Standards

A: The height of the embossing mold is more than 2.25 mm.

B: The height of the embossing mold is 2.00 mm.

C: The height of the embossing mold is 1.75 mm.

D: The height of the embossing mold is less than 1.75 mm.

Evaluation on Adhesion Resistance

Overlapping 10 pieces of the retroreflective sheeting of Embodiment 1 (10 cm×10 cm per piece) and clamping them at the top and the bottom with an aluminium alloy plate; loading a weight of 2.7 kg on the plate for standing at 60° C. for 24 h; then checking the appearance of the surface of the retroreflective sheeting. Obtaining the area rate that forms adhesion traces (the average value of the 10 pieces)

with respect to the total surface area of the surface of the retroreflective sheeting and making an evaluation as per the following standards.

Evaluation Standards

A: The area ratio of adhesion traces is more than 5% of the overall sheeting

B: The area ratio of adhesion traces is more than 5% and less than 15% of the overall sheeting.

C: The area ratio of adhesion traces is more than 15% and less than 30% of the overall sheeting.

D: The area ratio of adhesion traces is more than 30% and less than 50% of the overall sheeting.

E: The area ratio of adhesion traces is more than 50% of the overall sheeting.

Evaluation on Adhesion Printability

Printing specified images on the surface of the retroreflective sheeting of Embodiment 1 with a solvent type ink-jet printer (produced by ROLAND Company, Versa CAMM540i) and observing the appearance of the printed image on the sheeting surface and making an evaluation on the appearance (for ink rejection, color development, spreading of ink and ink penetration) as per the following standards.

Evaluation Standards

A: The appearance looks great.

B: The image is a slightly inferior to pre-set resolution ratio.

C: There is slight ink bleeding at the image edges.

D: The ink penetration is uneven and the color development is uneven.

E: It rejects the ink and fails to print.

The results of the evaluation on the weatherability, the embossing resistance, the adhesion resistance and the printability as per above methods are as follows:

TABLE 1

| | Acrylic polymer type 1 | | | | Acrylic polymer type 2 | | | | Type 1/ Type 2 | | Type of |
| --- | --- | --- | --- | --- | --- | --- | --- | --- | --- | --- | --- |
| | MMA (%) | EA (%) | 2HEMA (%) | Tg (° C.) | MMA (%) | EA (%) | 2HEMA (%) | Tg (° C.) | (mass ratio) | Tg (° C.) | crosslinking agent |
| Embodiment 1 | 57 | 36 | 7 | 40 | 21 | 65 | 14 | 2.7 | 70/30 | 21 | — |
| Embodiment 2 | 57 | 36 | 7 | 40 | 21 | 65 | 14 | 2.7 | 70/30 | 21 | A |
| Embodiment 3 | 57 | 36 | 7 | 40 | 21 | 65 | 14 | 2.7 | 70/30 | 21 | A |
| Embodiment 4 | 57 | 36 | 7 | 40 | 21 | 65 | 14 | 2.7 | 70/30 | 21 | A |
| Embodiment 5 | 57 | 36 | 7 | 40 | 21 | 65 | 14 | 2.7 | 70/30 | 21 | A |
| Embodiment 6 | 57 | 36 | 7 | 40 | 21 | 65 | 14 | 2.7 | 70/30 | 21 | A |
| Embodiment 7 | 57 | 36 | 7 | 40 | 21 | 65 | 14 | 2.7 | 70/30 | 21 | A |
| Embodiment 8 | 57 | 36 | 7 | 40 | 21 | 65 | 14 | 2.7 | 70/30 | 21 | A |
| Embodiment 9 | 57 | 36 | 7 | 40 | 21 | 65 | 14 | 2.7 | 70/30 | 21 | B |
| Embodiment 10 | 57 | 36 | 7 | 40 | 21 | 65 | 14 | 2.7 | 70/30 | 21 | C |
| Embodiment 11 | 57 | 36 | 7 | 40 | 21 | 65 | 14 | 2.7 | 70/30 | 21 | A |
| Embodiment 12 | MMA:EA:2HEMA = 47.6:45.4:7 (mass standard) | | | | | | | | | 27.1 | A |
| Embodiment 13 | MMA:EA:2HEMA = 53.4:39.6:7 (mass standard) | | | | | | | | | 35 | A |
| Embodiment 14 | MMA:EA:2HEMA = 33.4:59.6:7 (mass standard) | | | | | | | | | 10 | A |
| Comparative example 1 | 57 | 36 | 7 | 40 | 21 | 40 | 14 | 2.7 | 0/100 | 2.7 | A |
| Comparative example 2 | 57 | 36 | 7 | 40 | 21 | 65 | 14 | 2.7 | 100/0 | 40 | A |
| Comparative example 3 | 57 | 36 | 7 | 40 | 21 | 65 | 14 | 2.7 | 70/30 | 21 | A |
| Comparative example 4 | | | | | PVC | | | | | 80 | — |
| Comparative example 5 | | | | | PTE | | | | | 82 | — |

| | Additive amount (equivalent weight) | Coagulation ratio (mass %) | Thickness (μm) | Weatherability | Embossing resistance | Adhesion resistance | Printability |
| --- | --- | --- | --- | --- | --- | --- | --- |
| Embodiment 1 | — | 0 | 40 | C | A | C | C |
| Embodiment 2 | 0.01 | 10 | 40 | B | A | C | B |
| Embodiment 3 | 0.05 | 25 | 40 | A | B | A | B |
| Embodiment 4 | 0.1 | 35 | 40 | A | B | A | A |
| Embodiment 5 | 0.2 | 75 | 40 | A | B | A | C |
| Embodiment 6 | 0.3 | 80 | 40 | A | B | A | C |
| Embodiment 7 | 0.75 | 90 | 40 | B | B | B | C |
| Embodiment 8 | 1 | 95 | 40 | B | B | B | D |
| Embodiment 9 | 0.2 | 75 | 40 | A | C | A | C |
| Embodiment 10 | 1 | 75 | 40 | A | C | A | C |
| Embodiment 11 | 0.2 | 75 | 43 | A | A | A | C |
| Embodiment 12 | 0.2 | 75 | 40 | A | B | A | C |
| Embodiment 13 | 0.2 | 75 | 40 | A | C | A | C |
| Embodiment 14 | 0.2 | 75 | 40 | A | A | C | C |
| Comparative example 1 | 0.2 | 75 | 40 | D | A | D | C |
| Comparative example 2 | 0.2 | 75 | 40 | A | D | A | D |
| Comparative example 3 | 1 | 99 | 40 | A | D | A | D |
| Comparative example 4 | — | 69 | 40 | D | A | A | A |

TABLE 1-continued

| | | | | | | | |
|---|---|---|---|---|---|---|---|
| Comparative example 5 | — | 99 | 38 | D | A | A | E |

Notes to the Recorded Content in Table 1:

Crosslinking agent A—adduct type crosslinking agent of isocyanates (produced by Asahi Kasei Corporation, E405-70B)

Crosslinking agent B—crosslinking agent of isocyanates (produced by Bayer Company, N-75)

Crosslinking agent C—melamine crosslinking agent (produced by Sanwa Chemical Industrial Co., Ltd., NC-10)

MMA—methyl methacrylate (Tg103° C.)

EA—ethyl acrylate (Tg-27° C.)

2HEMA—methacrylic acid-2-hydroxyethyl (Tg55° C.)

Figure 2:
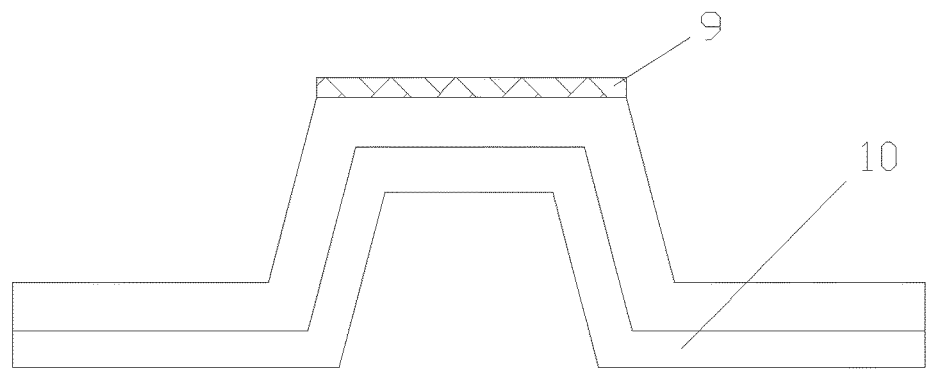
FIG. 2 is a schematic diagram of the marking part processed through embossing processing in the embodiments of the Invention.

As shown in FIG. 2, as the above retroreflective sheeting with favorable weatherability, embossing resistance and adhesion resistance is fitted with a metal plate 10, a recognizable marking printed object 9 is arranged on the retroreflective sheeting and a marking part protruded from the retroreflective sheeting is formed through embossing processing, a vehicle license plate with favorable weatherability is then formed.

The invention claimed is:

1. A retroreflective sheeting, comprising an outermost surface protective layer, wherein, the surface protective layer comprises at least one acrylic polymer, the coagulation ratio of which is 0%-95%; the glass-transition temperature (Tg) of the product generated from the reaction of the acrylic polymer of the surface protective layer is 10° C.-35° C.;
   wherein the acrylic polymer is a polymer with a weight-average molecular weight of more than 30,000; the number of carbon atoms in the alkyl acrylate monomer is 3-12; and
   wherein the surface protective layer of the retroreflective sheeting also comprises a retentive layer, a focusing layer and a light-reflecting layer laminated successively from top to bottom; a glass microbead is arranged between the retentive layer and the focusing layer; the glass microbead is embedded in the retentive layer and the focusing layer respectively; the thickness of the surface protective layer is 75% larger than the diameter of the glass microbead.

2. The retroreflective sheeting according to claim 1, wherein, the surface protective layer comprises at least two acrylic polymers; the Tg of one acrylic polymer is more than 35° C. or the Tg is lower than 10° C.; or the Tg of one polymer is more than 35° C. and the Tg of the other acrylic polymer is lower than 10° C.

3. The retroreflective sheeting according to claim 2, wherein, the coagulation ratio of the protective layer is 10%-80%.

4. The retroreflective sheeting according to claim 3, wherein, the acrylic polymer contains component units derived from hydroxylic monomers or carboxylic monomers; the acrylic polymer is crosslinked through the crosslinking agent of isocyanates.

5. The retroreflective sheeting according to claim 3, wherein, the acrylic polymer is a homopolymer of alkyl acrylate monomers, or a copolymer of at least one of hydroxylic monomers, carboxylic monomers, amino monomers and epoxy monomers copolymerized with the alkyl acrylate monomers.

6. The retroreflective sheeting according to claim 5, wherein, the alkyl acrylate monomer is selected from at least one of methyl acrylate, ethyl acrylate, n-propyl acrylate, isopropyl acrylate, n-butyl acrylate, tert-butyl acrylate, isobutyl acrylate, n-hexyl acrylate, cyclohexyl acrylate, 2-ethyl hexyl acrylate, n-octyl acrylate, iso-octyl acrylate, methyl methacrylate, ethyl methacrylate, n-propyl methacrylate, isopropyl methacrylate, n-butyl methacrylate, tert-butyl methacrylate, isobutyl methacrylate, n-hexyl methacrylate, cyclohexyl methacrylate, 2-ethyl hexyl methacrylate, n-octyl methacrylate, iso-octyl methacrylate.

7. The retroreflective sheeting according to claim 4, wherein, the hydroxylic monomer is alkyl acrylate or that containing allyl alcohol, methallyl alcohol and polyethylene glycol monoacrylate; the alkyl acrylate is selected from any one of acrylic acid-2-hydroxyethyl, acrylic acid-2-hydroxypropyl acrylate and acrylic acid-2-hydroxybutyl acrylate.

8. The retroreflective sheeting according to claim 5, wherein, the acrylic polymer is a polymer with a weight-average molecular weight of more than 30,000; the number of carbon atoms in the alkyl acrylate monomer is 3-12.

9. The retroreflective sheeting according to claim 6, wherein, the acrylic polymer is a polymer with a weight-average molecular weight of more than 30,000; the number of carbon atoms in the alkyl acrylate monomer is 3-12.

10. A vehicle license plate containing the retroreflective sheeting according to claim 8, further comprising a metal plate closely fitted to the retroreflective sheeting, wherein the metal plate and the retroreflective sheeting form a marking part protruded on one end of the retroreflective sheeting through embossing processing.

11. A vehicle license plate containing the retroreflective sheeting according to claim 9, further comprising a metal plate closely fitted to the retroreflective sheeting, wherein the metal plate and the retroreflective sheeting form a marking part protruded on one end of the retroreflective sheeting through embossing processing.

12. A vehicle license plate containing the retroreflective sheeting according to claim 1, further comprising a metal plate closely fitted to the retroreflective sheeting, wherein the metal plate and the retroreflective sheeting form a marking part protruded on one end of the retroreflective sheeting through embossing processing.

* * * * *